(12) United States Patent
Nakaya et al.

(10) Patent No.: US 12,337,914 B2
(45) Date of Patent: Jun. 24, 2025

(54) LINEAR DAMPER AND STEERING DEVICE

(71) Applicant: SOMIC MANAGEMENT HOLDINGS INC., Tokyo (JP)

(72) Inventors: Kazumasa Nakaya, Shizuoka (JP); Akifumi Endo, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 0 days.

(21) Appl. No.: 18/554,860

(22) PCT Filed: Feb. 24, 2022

(86) PCT No.: PCT/JP2022/007703
§ 371 (c)(1),
(2) Date: Oct. 11, 2023

(87) PCT Pub. No.: WO2022/230336
PCT Pub. Date: Nov. 3, 2022

(65) Prior Publication Data
US 2024/0375711 A1    Nov. 14, 2024

(30) Foreign Application Priority Data

Apr. 29, 2021 (JP) ................................. 2021-076911

(51) Int. Cl.
*B62D 7/22* (2006.01)
*B62D 3/12* (2006.01)

(52) U.S. Cl.
CPC ............... *B62D 7/228* (2013.01); *B62D 3/12* (2013.01)

(58) Field of Classification Search
CPC .................................. B62D 7/228; B62D 3/12
See application file for complete search history.

(56) References Cited

U.S. PATENT DOCUMENTS

2004/0134732 A1* 7/2004 Mintgen ................ F16F 9/064
188/322.22
2009/0194379 A1 8/2009 Maeda
(Continued)

FOREIGN PATENT DOCUMENTS

DE 102014206756 A1 10/2015
JP H04-125978 U 11/1992
(Continued)

OTHER PUBLICATIONS

JPH04128978U Machine English Translation (Year: 1992).*
(Continued)

*Primary Examiner* — Jason D Shanske
*Assistant Examiner* — Matthew James O'Neill
(74) *Attorney, Agent, or Firm* — Rankin, Hill & Clark LLP (57) ABSTRACT

Provided are a linear damper capable of reducing great collision sound or impact even when a great load rapidly acts and a steering device including the linear damper. A steering device 100 includes a linear damper 120 between a rack bar 103 and a rack end 106. In the linear damper 120, a relative displacement body 140 is provided to be reciprocatably displaceable in an inner chamber forming body 121 formed in a cylindrical shape. In the inner chamber forming body 121, a first inner chamber 125a and a second inner chamber 125b are formed on both sides of a valve support portion 123 supporting first flow control valves 127 and a second flow control valve 128. An end portion of the inner chamber forming body 121 facing a rack housing 104 is provided with a bumper portion 131. The bumper portion 131 is produced in such a manner that an elastically-deformable elastic body is formed into a circular ring shape.

12 Claims, 3 Drawing Sheets

(56) References Cited

U.S. PATENT DOCUMENTS

2017/0267282 A1* 9/2017 Ogata .................. F16F 3/10
2023/0234633 A1  7/2023 Nakaya
2023/0242178 A1  8/2023 Nakaya

FOREIGN PATENT DOCUMENTS

| JP | H04128978 U | * | 11/1992 |
| JP | 2004-069064 A | | 3/2004 |
| JP | 2006-138359 A | | 6/2006 |
| WO | 2021/246081 A1 | | 12/2021 |
| WO | 2021/246082 A1 | | 12/2021 |

OTHER PUBLICATIONS

International Search Report dated Apr. 5, 2022 filed in PCT/JP2022/007703.
Extended European Search Report dated Apr. 9, 2025 issued for European patent application No. 22795259.5.

* cited by examiner

LINEAR DAMPER AND STEERING DEVICE

TECHNICAL FIELD

The present invention relates to a linear damper configured to damp motion energy of linear motion and a steering device including the linear damper.

BACKGROUND ART

Typically, there has been a linear damper configured to damp motion energy of linear motion. For example, the inventor(s) of the present application has proposed a linear damper as described in Patent Literature 1 below. In this linear damper, an impact load caused between a rack end and a rack housing in a steering device of a self-propelled vehicle is reduced by damping force generated on the rack end displaceable relative to the rack housing by limiting the flow of fluid.

CITATION LIST

Patent Literature

PATENT LITERATURE 1: Japanese Patent Application No. 2020-096430

SUMMARY OF INVENTION

However, the linear damper disclosed in Patent Literature 1 above has such a problem that when the rack end rapidly approaches the rack housing and the linear damper collides with the rack housing, great collision sound is caused and great impact is instantaneously applied to the steering device.

The present invention has been made in order to cope with the above-described problem. An object of the present invention is to provide a linear damper capable of reducing great collision sound or impact even when a great load rapidly acts and a steering device including the linear damper.

To achieve the aforementioned object, the present invention features a linear damper including: an inner chamber forming body formed in a tubular shape and having, inside a tubular portion, an inner chamber where fluid is liquid-tightly housed; a relative displacement body slidably fitted in the inner chamber forming body and formed displaceable relative to the inner chamber forming body; and a flow control valve provided for at least one of the inner chamber forming body or the relative displacement body to allow the fluid to flow while limiting a flow of the fluid, in which: the linear damper is arranged between two attachment target objects linearly displaceable relative to each other to damp external force received due to relative displacement by limiting the flow of the fluid; one of the inner chamber forming body or the relative displacement body has an attachment portion to be attached to one of the two attachment target objects; another one of the inner chamber forming body or the relative displacement body has a bumper portion with which the other one of the two attachment target objects bumps; and the bumper portion includes an elastic body elastically receiving bump of the other one of the two attachment target objects.

According to this configuration, in the linear damper, the bumper portion includes the elastic body. Thus, even in a case where the bumper portion collides with a portion of the attachment target object facing the bumper portion among the two attachment target objects for which the linear damper is provided and a great load rapidly acts thereon, great collision sound or impact can be reduced.

Another aspect of the present invention is that the linear damper further includes a return elastic body providing elastic force to at least one of the inner chamber forming body or the relative displacement body to elastically press the inner chamber forming body or the relative displacement body formed with no bumper portion in a direction apart from the bumper portion.

According to this configuration, in the linear damper, the return elastic body provides elastic force to the inner chamber forming body or the relative displacement body formed with no bumper portion, and accordingly, elastically displace the inner chamber forming body or the relative displacement body in the direction apart from the bumper portion. Thus, in the linear damper according to the present invention, in a case where no external force of displacing the inner chamber forming body and the relative displacement body relative to each other acts, the inner chamber forming body or the relative displacement body formed with no bumper portion is constantly positioned at an end portion on the side apart from the bumper portion in a relative displacement area, i.e., an operation start position for fulfilling the damping function of the flow control valve, so that the stroke of the relative displacement body can be maximized.

Still another feature of the present invention is the linear damper in which the bumper portion is formed in an annular shape.

According to this configuration, in the linear damper, the bumper portion is formed in the annular shape. Thus, the entirety or part of at least one of the two attachment target objects for which a component of the linear damper or the linear damper is provided can be arranged inside the bumper portion. Variations in the configuration, installation target, or installation form of the linear damper can be increased.

Still another feature of the present invention is the linear damper in which the bumper portion is made of an elastomer material.

According to this configuration, in the linear damper, the bumper portion is made of the elastomer material. Thus, as compared to a case where the bumper portion is made of a metal material such as a coil spring, the collision sound or the impact can be more effectively reduced. The elastomer material is, for example, a rubber material or a resin material which can elastically receive impact upon collision of the bumper portion with an object. More specifically, the elastomer material includes, for example, thermosetting elastomer materials (e.g., vulcanized rubber, urethane rubber, silicone rubber, and fluorine-containing rubber) and thermoplastic elastomer materials (e.g., styrene-based, olefin-based, vinyl chloride-based, urethane-based, and amide-based resins). Needless to say, the bumper portion may be made of a material other than the elastomer material, such as a metal plate or coil spring.

Still another feature of the present invention is the linear damper in which the bumper portion is formed with at least one of a bottomed hole or a through-hole.

According to the still another feature of the present invention as described above, in the linear damper, the bumper portion is formed with at least one of the bottomed hole or the through-hole. Thus, force of damping impact by the bumper portion can be adjusted according to the number, size, or position of the bottomed hole or the through-hole.

Still another aspect of the present invention is that in the linear damper, the inner chamber forming body and the relative displacement body each have displacement limit defining portions defining one and another displacement limits in an range of the relative displacement by bump by the relative displacement, and the displacement limit defining portion for at least one of the one displacement limit or the other displacement limit includes an elastic body.

According to the still another feature of the present invention as described above, in the linear damper, the displacement limit defining portion for at least one of the one displacement limit or the other displacement limit in the relative displacement range of the relative displacement body includes the elastic body. Thus, in the linear damper, the displacement limit defining portion including the elastic body is provided at one displacement limit position in the relative displacement range of the relative displacement body so that impact when the relative displacement body has reached the one displacement limit position can be buffered and external force can be damped even in a case where the external force is further applied. Moreover, in the linear damper, the displacement limit defining portion including the elastic body is provided at the other displacement limit position in the relative displacement range of the relative displacement body so that impact when the relative displacement body has reached the other displacement limit position can be buffered and external force can be damped even in a case where the external force is further applied. That is, the linear damper can damp impact or external force when the relative displacement body has reached the displacement limit position in response to the external force and/or when the relative displacement body has reached the original displacement limit position before receiving the external force.

Still another feature of the present invention is the linear damper in which the relative displacement body includes a volume change compensation device configured to compensate for a change in the volume of the fluid in the inner chamber.

According to the still another feature of the present invention as described above, in the linear damper, the relative displacement body includes the volume change compensation device configured to compensate for the change in the volume of the fluid in the inner chamber. Thus, the configuration of the linear damper can be compactified.

The present invention can be implemented not only as the invention relating to the linear damper, but also as the invention relating to the steering device including the linear damper.

The steering device, which includes: a steering shaft formed so as to extend in a bar shape and configured to rotate by operation of a steering wheel; a rack bar formed to extend in a bar shape to transmit a reciprocating motion, converted from a rotary motion of the steering shaft, in an axis direction; an intermediate coupling body coupled to each end portion of the rack bar and directly or indirectly coupling a wheel targeted for steering to the each end portion; and a rack housing covering the rack bar, has the linear damper according to any one of claims 1 to 7, in which the linear damper is provided between the rack housing and the rack bar or the intermediate coupling body to damp impact from the wheel and/or impact due to inertial force from a side of the steering shaft. The steering device according to the present invention is thereby expected to have an operation and effect similar to those of the aforementioned linear damper.

In this case, in the steering device, the relative displacement body may be connected to the intermediate coupling body, and the inner chamber forming body may be formed so as to contact or separate from the rack housing by the reciprocating motion of the rack bar.

According to this configuration, in the steering device according to the present invention, the relative displacement body is connected to the intermediate coupling body. Further, the inner chamber forming body is formed so as to contact or separate from the rack housing by the reciprocating motion of the rack bar, and the damper is provided for the intermediate coupling body such as a tie rod or a rack end. Thus, maintenance or replacement of the linear damper can be facilitated.

In this case, in the steering device, the inner chamber forming body may be connected to an end portion of the rack housing, and the relative displacement body may be formed such that the rack bar or the intermediate coupling body penetrates therethrough and the rack bar or the intermediate coupling body contacts or separates from the relative displacement body by the reciprocating motion of the rack bar.

According to this configuration, in the steering device according to the present invention, the inner chamber forming body is provided at the end portion of the rack housing. Further, the relative displacement body is formed such that the rack bar or the intermediate coupling body (e.g., tie rod or rack end) penetrates through the relative displacement body and the rack bar or the tie rod contacts or separates from the relative displacement body by the reciprocating motion of the rack bar. With this configuration, in the steering device according to the present invention, the linear damper is provided for the rack housing so that the rack bar or the intermediate coupling body (e.g., tie rod or rack end) can be reduced in weight.

DESCRIPTION OF EMBODIMENTS

Figure 1:
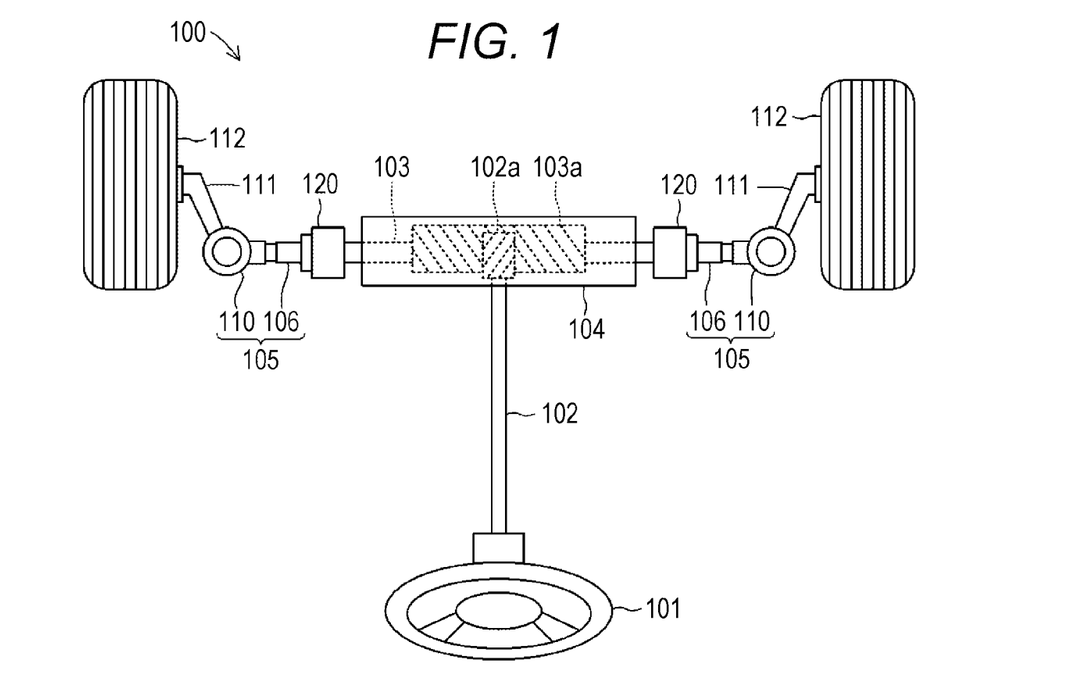
FIG. 1 is a schematic view describing the outline of an entire configuration of a steering device according to an embodiment of the present invention.
Figure 2:
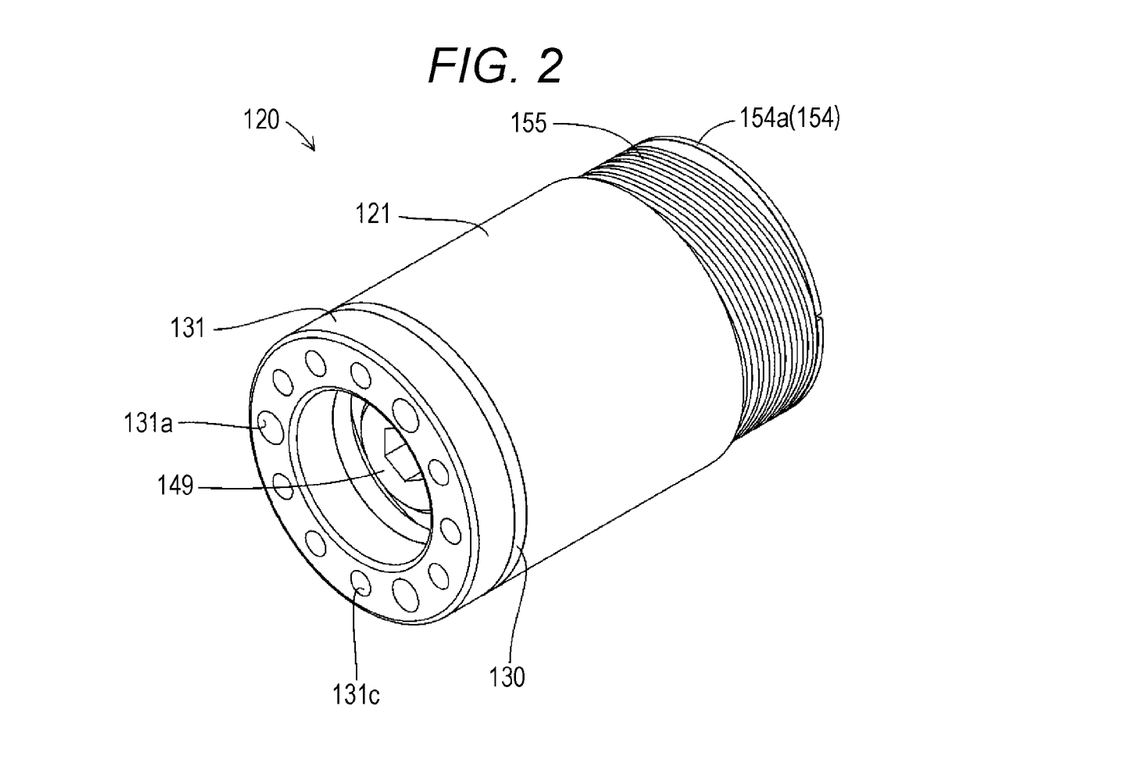
FIG. 2 is a perspective view showing the outline of an external configuration of a linear damper forming the steering device shown in FIG. 1.
Figure 3:
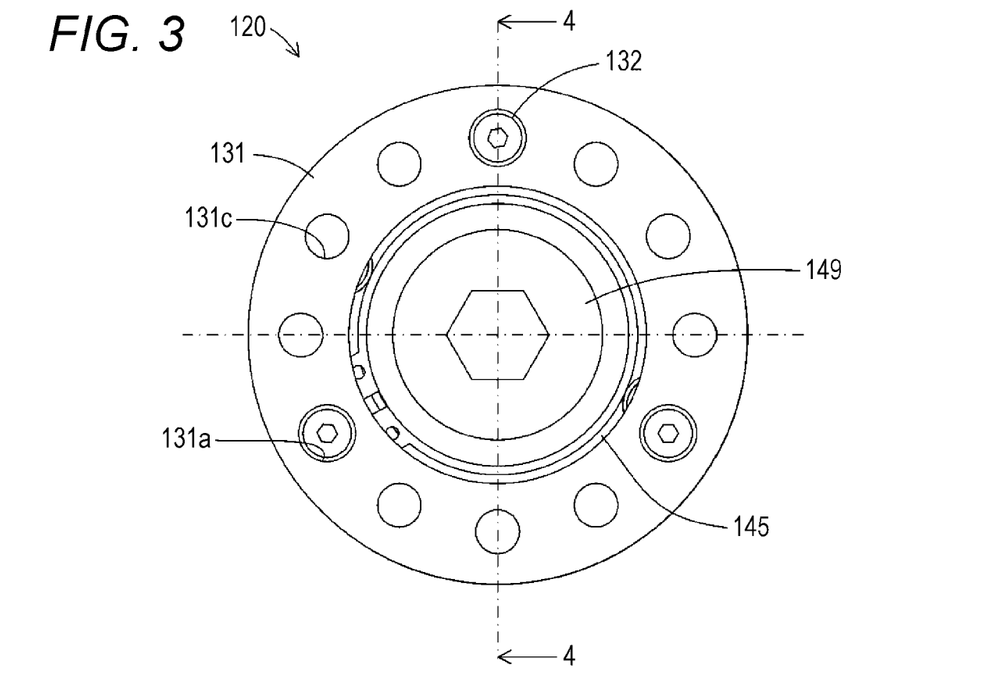
FIG. 3 is a front view showing the outline of the external configuration of the linear damper shown in FIG. 2.
Figure 4:
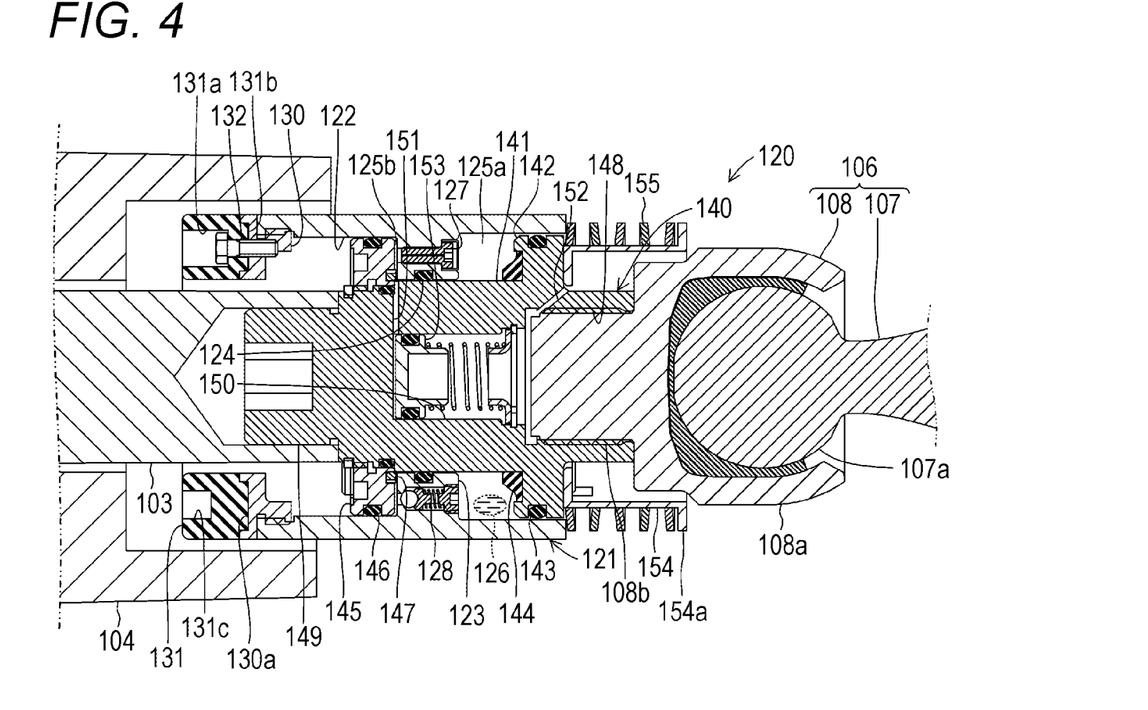
FIG. 4 is a sectional view showing the outline of an internal configuration of the linear damper along a 4-4 line shown in FIG. 3.

Hereinafter, one embodiment of a steering device including a linear damper according to the present invention will be described with reference to the drawings. FIG. 1 is a schematic view describing the outline of an entire configuration of a steering device 100 according to the embodiment of the present invention. FIG. 2 is a perspective view showing the outline of an external configuration of a linear damper 120 forming the steering device 100 shown in FIG. 1. FIG. 3 is a front view showing the outline of the external configuration of the linear damper 120 shown in FIG. 2. FIG. 4 is a sectional view showing the outline of an internal configuration of the linear damper 120 along a 4-4 line shown in FIG. 3.

The steering device 100 is a mechanical device for steering two front wheels (or rear wheels) of a four-wheeled self-propelled vehicle (not shown) in the right-left direction.
(Configuration of Steering Device 100)

The steering device 100 includes a steering wheel 101. The steering wheel 101 is an operator (i.e., handle) for manually operating a travelling direction by a driver of the self-propelled vehicle. The steering wheel 101 is produced in such a manner that a resin material or a metal material is formed into a circular ring shape. A steering shaft 102 is coupled to the steering wheel 101.

The steering shaft 102 is a component formed in a bar shape and configured to rotate about an axis according to clockwise or counterclockwise rotary operation of the steering wheel 101. The steering shaft 102 is produced in such a manner that one or more metal bars are coupled via, e.g., a universal joint. The steering wheel 101 is coupled to one end portion of the steering shaft 102. A pinion gear 102*a* is formed at the other end portion, and a rack bar 103 is coupled thereto.

The rack bar 103 is a component formed in a bar shape and configured to reciprocatably displace in an axis direction to transmit steering force for two wheels 112 and the amount of steering of each wheel 112 to knuckle arms 111. The rack bar 103 is made of a metal material. In this case, a rack gear 103*a* is formed at part of the rack bar 103, and engages with the pinion gear 102*a* of the steering shaft 102. That is, the pinion gear 102*a* and the rack gear 103*a* form a rack-and-pinion mechanism (steering gear box) configured to convert rotary motion of the steering shaft 102 into linear reciprocating motion of the rack bar 103.

Both end portions of the rack bar 103 in the axis direction are exposed from a rack housing 104 with the rack-and-pinion mechanism covered with the rack housing 104. Each wheel 112 is coupled to a corresponding one of the both end portions of the rack bar 103 exposed from the rack housing 104 via the linear damper 120, an intermediate coupling body 105, and the knuckle arm 111.

The rack housing 104 is a component for covering and protecting a main portion of the rack bar 103, such as the rack-and-pinion mechanism. The rack housing 104 is produced in such a manner that a metal material is formed into a cylindrical shape. The rack housing 104 is attached in a fixed manner to a chassis (not shown) of the self-propelled vehicle.

The intermediate coupling body 105 is a component for transmitting the steering force and the steering amount, which are transmitted from the rack bar 103, to the knuckle arm 111. The intermediate coupling body 105 mainly includes a rack end 106 and a tie rod 110. The rack end 106 is a component which movably couples the tie rod 110 to a tip end portion of the rack bar 103 and to which the linear damper 120 is coupled. The rack end 106 mainly includes a stud 107 and a socket 108.

The stud 107 is a component for movably coupling the tie rod 110 to the socket 108. The stud 107 is produced in such a manner that a metal material is formed into a round bar shape. A spherical ball portion 107*a* is formed at one (left as viewed in the figure) end portion of the stud 107, and an external thread portion (not shown) to be screwed into an end portion of the tie rod 110 is formed at the other (right as viewed in the figure) end portion.

The socket 108 is a component for movably coupling the stud 107 to a tip end portion of a relative displacement body 140. The socket 108 is produced in such a manner that a metal material is formed into a round bar shape. More specifically, the socket 108 mainly includes a socket body 108*a* and a coupling portion 108*b*. The socket body 108*a* is a portion slidably holding the ball portion 107*a*. The socket body 108*a* is formed in a recessed spherical shape covering the ball portion 107*a*. The coupling portion 108*b* is a shaft-shaped portion to be coupled to the relative displacement body 140. The coupling portion 108*b* is formed with an external thread portion to be screwed into the relative displacement body 140.

The tie rod 110 is a component movably coupling the knuckle arm 111 to a tip end portion of the rack end 106. The tie rod 110 is produced in such a manner that a ball joint is movably attached to a tip end portion of a tie rod body extending in a bar shape. The knuckle arm 111 is a metal component for holding the wheel 112 on the tie rod 110 and transmitting the steering force and the steering amount, which are transmitted from the tie rod 110, to the wheel 112. The knuckle arm 111 is formed in such a shape that multiple bar-shaped bodies extend from the periphery of a cylindrical portion. The wheels 112 are a pair of right and left components configured to roll on a road surface to move the self-propelled vehicle forward or backward. The wheel 112 is produced in such a manner that a rubber tire is attached to the outside of a metal wheel.

The linear damper 120 is a tool for absorbing inertial force from the steering shaft 102 side and/or strong pressing force (impact) transmitted from the wheel 112. The linear damper 120 is provided between each of the right and left intermediate coupling bodies 105 and each end portion of the rack bar 103. The linear damper 120 includes an inner chamber forming body 121.

The inner chamber forming body 121 is a component forming a first inner chamber 125*a* and a second inner chamber 125*b* and supporting the relative displacement body 140. The inner chamber forming body 121 is produced in such a manner that a metal material is formed into a cylindrical shape. In the inner chamber forming body 121, a valve support portion 123 is formed at a center portion of an inner peripheral surface 122 in the axis direction thereof. The valve support portion 123 is a portion supporting first flow control valves 127, a second flow control valve 128, and the relative displacement body 140. The valve support portion 123 is formed so as to project inward in the radial direction in a circular ring shape from the inner peripheral surface 122.

The valve support portion 123 is formed with four through-holes, which penetrate the valve support portion 123 in the axis direction thereof, at equal intervals along the circumferential direction. The first flow control valves 127 are each fitted and held in three of these four through-holes. Further, the second flow control valve 128 is fitted and held in the remaining through-hole. A seal ring 124 formed of an elastic body is fitted in the inner peripheral surface of the valve support portion 123, and the relative displacement body 140 is slidably fitted in the inner peripheral surface of the valve support portion 123 in this state. With this configuration, the first inner chamber 125*a* and the second inner chamber 125*b* are formed on both sides of the valve support portion 123 in the axis direction of the inner chamber forming body 121.

The first inner chamber 125*a* and the second inner chamber 125*b* are portions where fluid 126 is liquid-tightly housed. The first inner chamber 125*a* and the second inner chamber 125*b* are formed in a circular tubular shape extending in the axis direction on an outer peripheral portion of the relative displacement body 140. That is, the first inner chamber 125*a* and the second inner chamber 125*b* are formed as spaces between the relative displacement body 140 and the inner chamber forming body 121. In this case, the first inner chamber 125a is formed between a first inner chamber forming wall 142 of the relative displacement body 140 and the valve support portion 123.

The second inner chamber 125b is formed between a second inner chamber forming wall 145 of the relative displacement body 140 and the valve support portion 123. The volumes of the first inner chamber 125a and the second inner chamber 125b change according to the position of the relative displacement body 140 reciprocatably sliding in the inner chamber forming body 121. The first inner chamber 125a and the second inner chamber 125b are equivalent to an inner chamber according to the present invention.

The fluid 126 is a substance causing the linear damper 120 to fulfill a damper function using resistance when flowing in each of the three first flow control valves 127 arranged between the first inner chamber 125a and the second inner chamber 125b. The inside of the spaces formed as the first inner chamber 125a and the second inner chamber 125b is filled with the fluid 126. The fluid 126 includes a liquid, gel, or semisolid substance having flowability and viscosity according to the specifications of the linear damper 120. In this case, the viscosity of the fluid 126 is selected as necessary according to the specifications of the linear damper 120. In the present embodiment, the fluid 126 includes, for example, oil such as mineral oil and silicone oil. Note that in FIGS. 4 to 6, the fluid 126 is hatched in dashed circles.

Each of the three first flow control valves 127 is configured as a valve allowing the fluid 126 to flow in both directions while limiting the flow of the fluid 126 between the first inner chamber 125a and the second inner chamber 125b. In this case, the flow of the fluid 126 being limited in the first flow control valve 127 means that as compared to the degree of ease of flow of the fluid 126 in the flow direction thereof in the second flow control valve 128, the fluid 126 is less likely to flow under the same conditions (e.g., a pressure and a hydraulic fluid viscosity).

The second flow control valve 128 is configured as a valve allowing the fluid 126 to flow from the second inner chamber 125b side to the first inner chamber 125a side and blocking the flow of the fluid 126 from the first inner chamber 125a side to the second inner chamber 125b side.

A bumper portion 131 is provided at one (left as viewed in the figure) of both end portions of the inner chamber forming body 121 via a support base 130. The support base 130 is a component for supporting the bumper portion 131. The support base 130 is produced in such a manner that a metal material is formed into a circular ring shape. Of the support base 130, an outer peripheral portion of an end portion on the inner chamber forming body 121 side is formed with an external thread for screwing an end portion of the inner peripheral surface 122 of the inner chamber forming body 121 thereon, and an end surface of an end portion opposite to such an end portion is formed with a fitting portion 130a. The fitting portion 130a is a portion in which the bumper portion 131 is to be fitted. The fitting portion 130a is produced in such a manner that a recessed groove is formed in a circular ring shape.

The bumper portion 131 is a component configured to buffer impact when the linear damper 120 collides with the rack housing 104. The bumper portion 131 is produced in such a manner that an elastically-deformable elastic body is formed into a circular ring shape. In the present embodiment, the bumper portion 131 is made of a rubber material. Through-holes 131a are formed so as to penetrate the bumper portion 131 in the axis direction. The through-hole 131a is a hole through which a bolt 132 for attaching the bumper portion 131 to the support base 130 penetrates. Three through-holes 131a are formed at equal intervals along the circumferential direction of the bumper portion 131.

The bumper portion 131 is formed with a fitting portion 131b at one (right as viewed in the figure) end portion in the axis direction and bottomed holes 131c at the other (left as viewed in the figure) end portion. The fitting portion 131b is a portion to be fitted in the recessed fitting portion 130a of the support base 130 to define the attachment position of the bumper portion 131. The fitting portion 131b is formed with a circular ring-shaped raised portion to be fitted in the fitting portion 130a.

The bottomed hole 131c is a bottomed hole for adjusting the elastic force of the bumper portion 131. Three bottomed holes 131c are formed between adjacent ones of the three through-holes 131a along the circumferential direction of the bumper portion 131. These bottomed holes 131c are formed so as to have a depth of about the half of the length of the bumper portion 131 in the axis direction. Note that as in the bottomed holes 131c, the three through-holes 131a also fulfill a function of adjusting the elastic force of the bumper portion 131.

The relative displacement body 140 is a component for coupling the rack bar 103 and the rack end 106 to each other and forming, together with the inner chamber forming body 121, the first inner chamber 125a and the second inner chamber 125b. The relative displacement body 140 is produced in such a manner that a metal material is formed into a round bar shape. The relative displacement body 140 mainly includes an inner chamber facing portion 141, the first inner chamber forming wall 142, the second inner chamber forming wall 145, a rack end coupling portion 148, a rack bar coupling portion 149, and a compensation device housing portion 150.

The inner chamber facing portion 141 is a portion which forms the first inner chamber 125a and the second inner chamber 125b and on which the valve support portion 123 slides. The inner chamber facing portion 141 includes a smooth curved surface having a circular section. The inner chamber facing portion 141 is formed at a center portion of the relative displacement body 140 in the axis direction.

The first inner chamber forming wall 142 is a portion forming the first inner chamber 125a and configured to slide on the inner peripheral surface 122 of the inner chamber forming body 121 to press the fluid 126. The first inner chamber forming wall 142 is formed so as to project in a flange shape from one (right as viewed in the figure) end portion of the inner chamber facing portion 141. In this case, the first inner chamber forming wall 142 is integrally made of the same material as that of the relative displacement body 140. A seal ring 143 formed of an elastic body is fitted in an outer peripheral portion of the first inner chamber forming wall 142, and on the outer peripheral portion of the first inner chamber forming wall 142 in this state, the inner peripheral surface 122 of the inner chamber forming body 121 is slidably fitted. The first inner chamber forming wall 142 is provided with a first displacement limit defining portion 144 at an end surface on the first inner chamber 125a side.

The first displacement limit defining portion 144 is a component for defining the displacement limit of one of both ends of the relative displacement body 140 in the displacement range thereof and buffering impact upon bump when the first inner chamber forming wall 142 displaces to the valve support portion 123 side and bumps the first displacement limit defining portion 144. The first displacement limit defining portion 144 is produced in such a manner that an elastically-deformable elastic body is formed into a circular ring shape. In the present embodiment, the first displacement limit defining portion 144 is made of a rubber material. Moreover, the first displacement limit defining portion 144 is formed in a tapered conical shape having a greater outer diameter on the first inner chamber forming wall 142 side than on the valve support portion 123 side.

The second inner chamber forming wall 145 is a portion forming the second inner chamber 125b and configured to slide on the inner peripheral surface 122 of the inner chamber forming body 121 to press the fluid 126. The second inner chamber forming wall 145 is provided so as to project in a flange shape from the other (left as viewed in the figure) end portion of the inner chamber facing portion 141. The second inner chamber forming wall 145 is produced in such a manner that a metal material different from that of the relative displacement body 140 is formed into a circular ring shape. The second inner chamber forming wall 145 is screwed onto an outer peripheral portion of the relative displacement body 140, and accordingly, is integrated with the relative displacement body 140.

A seal ring 146 formed of an elastic body is fitted in an outer peripheral portion of the second inner chamber forming wall 145, and on the outer peripheral portion of the second inner chamber forming wall 145 in this state, the inner peripheral surface 122 of the inner chamber forming body 121 is slidably fitted. Further, the second inner chamber forming wall 145 is provided with a second displacement limit defining portion 147 at an end surface on the second inner chamber 125b side.

The second displacement limit defining portion 147 is a component for defining the displacement limit of the other end of the relative displacement body 140 in the displacement range thereof and buffering impact upon bump when the second inner chamber forming wall 145 displaces to the valve support portion 123 side and bumps the second displacement limit defining portion 147. The second displacement limit defining portion 147 is produced in such a manner that an elastically-deformable elastic body is formed into a circular ring shape. In the present embodiment, the second displacement limit defining portion 147 is made of a rubber material.

The rack end coupling portion 148 is a portion to which the socket 108 of the rack end 106 is to be coupled. The rack end coupling portion 148 extends in the axis direction of the relative displacement body 140, and is formed in a bottomed hole opened at the right end portion as viewed in the figure. In this case, in the rack end coupling portion 148, an internal thread to be screwed onto the external thread of the coupling portion 108b of the socket 108 is formed at the inner peripheral surface of the bottomed hole.

The rack bar coupling portion 149 is a portion to which the rack bar 103 is to be coupled. The rack bar coupling portion 149 extends in the axis direction of the relative displacement body 140, and an internal thread to be screwed onto an external thread formed at an end portion of the rack bar 103 is formed at the inner peripheral surface of a bottomed hole opened at the left end portion as viewed in the figure. The rack end coupling portion 148 and the rack bar coupling portion 149 are equivalent to an attachment portion according to the present invention.

The compensation device housing portion 150 is a portion where a volume change compensation device 153 is liquid-tightly housed. The compensation device housing portion 150 is formed in a bottomed hole shape formed integrally with the rack end coupling portion 148. The compensation device housing portion 150 communicates with the second inner chamber 125b via an inner chamber communication path 151, and communicates with the atmosphere outside the linear damper 120 via an atmosphere communication path 152.

The volume change compensation device 153 is an instrument configured to compensate for a change in the volume of the fluid 126 in the first inner chamber 125a and the second inner chamber 125b due to expansion or contraction due to a temperature change. The volume change compensation device 153 is configured such that a piston reciprocatably sliding in the compensation device housing portion 150 is housed with elastically pressed to the inner chamber communication path 151 side by a coil spring. In this case, a space where the coil spring is housed communicates with the atmosphere outside the linear damper 120 via the atmosphere communication path 152.

An elastic body holder 154 is attached to a cylindrical outer portion, which is formed with the rack end coupling portion 148, of the relative displacement body 140. The elastic body holder 154 is a component for holding a return elastic body 155. The elastic body holder 154 is produced in such a manner that a metal material is formed into a cylindrical shape. The elastic body holder 154 holds the return elastic body 155 at an outer peripheral portion. In this case, at the outer peripheral portion of the elastic body holder 154, one end portion in the axis direction projects in a flange shape and forms a receiving portion 154a. The receiving portion 154a receives one end portion of the return elastic body 155.

The return elastic body 155 is a component for elastically pressing the first inner chamber forming wall 142 and the second inner chamber forming wall 145 of the relative displacement body 140 against the right end portions in the first inner chamber 125a and the second inner chamber 125b as viewed in the figure. The return elastic body 155 is produced in such a manner that multiple metal wave washers are arranged on one another in the axis direction of the elastic body holder 154. Of the return elastic body 155, one (right as viewed in the figure) end portion elastically presses the receiving portion 154a of the elastic body holder 154, and the other (left as viewed in the figure) end portion elastically presses the right end portion of the inner chamber forming body 121 as viewed in the figure.

(Operation of Steering Device 100)

Next, operation of the steering device 100 configured as described above will be described. The steering device 100 is incorporated into the self-propelled vehicle as a mechanism configured to steer the wheels (e.g., the two front wheels) of the not-shown four-wheeled self-propelled vehicle in the right-left direction. The steering device 100 changes the direction of each of the two wheels 112 according to operation of the steering wheel 101 by the driver of the self-propelled vehicle, thereby determining the travelling direction of the self-propelled vehicle.

During driving of such a self-propelled vehicle, the linear dampers 120 in the steering device 100 act in the case where the rack bar 103 displaces to the vicinity of the right-left displacement limit with respect to the pinion gear 102a. In this case, the displacement limit of the rack bar 103 is the right-left steering limit of the wheels 112. The relevant case is, for example, a case where: the driver of the self-propelled vehicle has turned the steering wheel 101 clockwise or counterclockwise to the vicinity of a turning limit; and great input acts on the rack bar 103 from the wheel 112 side due to collision of the wheel 112 with an obstacle such as a curbstone.

First, a case where no external force acts on the linear damper 120 and the linear damper 120 is not operated will be described. As shown in FIG. 4, in an range where the rack bar 103 does not reach the vicinity of the displacement limit, such as a case where the wheels 112 of the self-propelled vehicle are not steered to the vicinity of the steering limit, the inner chamber forming body 121 does not collide with the rack housing 104, and therefore, the linear damper 120 is not operated. In this case, in the linear damper 120, the return elastic body 155 elastically presses the inner chamber forming body 121 to the left side as viewed in the figure in the displacement range of the inner chamber forming body 121, and accordingly, the second inner chamber forming wall 145 for which the displacement limit is defined is elastically pressed against the valve support portion 123 via the second displacement limit defining portion 147, as shown in FIG. 4.

Figure 5:
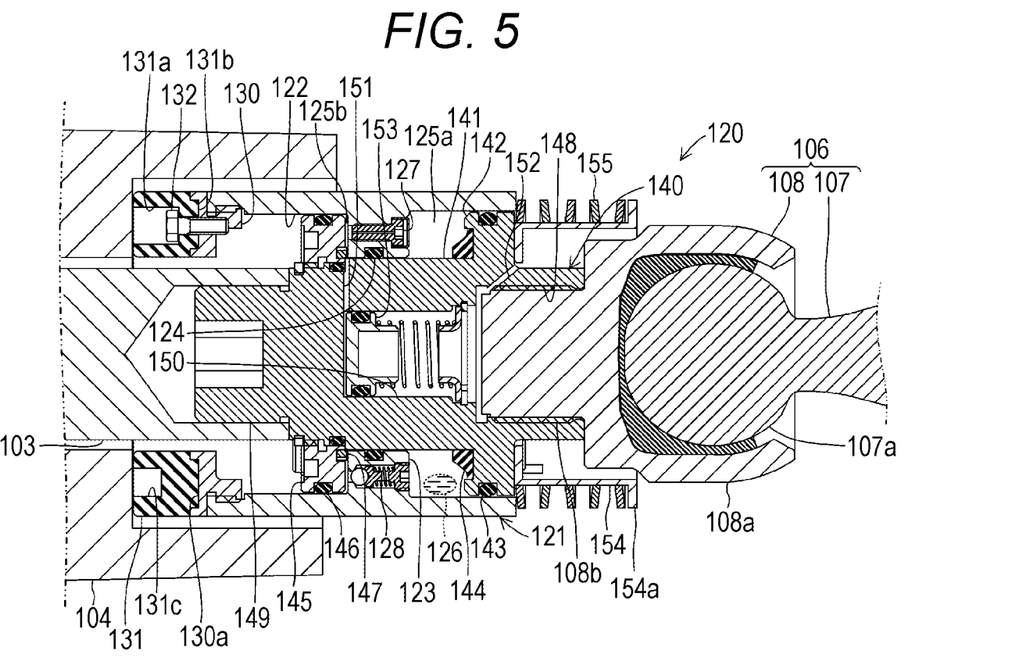
FIG. 5 is a sectional view showing a state at the moment when an inner chamber forming body in the linear damper shown in FIG. 4 has contacted a rack housing.

Next, a case where external force acts on the linear damper 120 and the linear damper 120 is operated accordingly will be described. As shown in FIG. 5, in a case where the rack bar 103 has reached the vicinity of the displacement limit, such as a case where the wheels 112 of the self-propelled vehicle have been steered to the vicinity of the steering limit, the end portion of the inner chamber forming body 121 contacts the rack housing 104, and operation of the linear damper 120 is started accordingly. That is, the rack housing 104 is equivalent to the other one of two attachment target objects according to the present invention. Note that the intermediate coupling body 105 is equivalent to one of the two attachment target objects according to the present invention.

Figure 6:
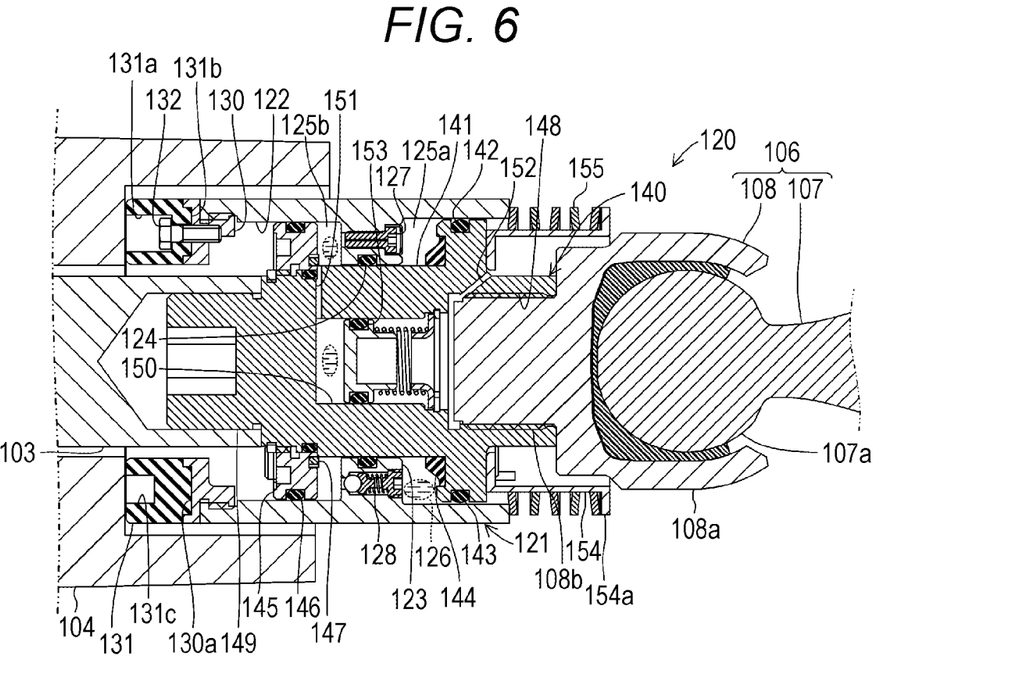
FIG. 6 is a sectional view showing a state in which the inner chamber forming body in the linear damper shown in FIG. 4 is pressed to the rack housing side.

In this case, the linear damper 120 first damp impact upon bump in such a manner that the bumper portion 131 bumps the rack housing 104 and is compressed and elastically deformed accordingly. Subsequently, as shown in FIG. 6, in the linear damper 120, when the bumper portion 131 has reached an elastic deformation limit, the relative displacement body 140 displaces to the rack housing 104 side against the elastic force of the return elastic body 155 in the inner chamber forming body 121. That is, the relative displacement body 140 displaces while the first inner chamber forming wall 142 is pushing the fluid 126 toward the valve support portion 123.

In this manner, the linear damper 120 generates damping force in such a manner that the fluid 126 in the first inner chamber 125a flows with flow resistance to the second inner chamber 125b side in each of the three first flow control valves 127. Then, when the first inner chamber forming wall 142 bumps the valve support portion 123 in the linear damper 120, the first displacement limit defining portion 144 bumps the valve support portion 123 to damp impact upon bump and external force of displacing the relative displacement body 140 by elastic deformation by compression.

Next, in a case where the wheels 112 of the self-propelled vehicle return to original positions after the wheels 112 have been steered to the vicinity of the steering limit and the rack bar 103 has reached the vicinity of the displacement limit, the relative displacement body 140 displaces, in the linear damper 120, in a direction apart from the rack housing 104 in the inner chamber forming body 121. That is, the relative displacement body 140 displaces while the second inner chamber forming wall 145 is pushing the fluid 126 toward the valve support portion 123 by the return elastic body 155.

Accordingly, in the linear damper 120, the fluid 126 in the second inner chamber 125b flows with extremely-small flow resistance to the first inner chamber 125a side in the single second flow control valve 128. That is, the linear damper 120 generates almost no damping force against the external force when the relative displacement body 140 returns. When the second inner chamber forming wall 145 bumps the valve support portion 123 in the linear damper 120, the second displacement limit defining portion 147 bumps the valve support portion 123 to damp impact upon bump by elastic deformation by compression (see FIG. 4).

Next, in the linear damper 120, after the second displacement limit defining portion 147 has bumped the valve support portion 123, the inner chamber forming body 121 displaces in the direction apart from the rack housing 104, and accordingly, the inner chamber forming body 121 moves apart from the rack housing 104 while the compressed and deformed bumper portion 131 is released (see FIG. 4). Accordingly, the wheels 112 of the self-propelled vehicle return to the original positions.

As can be understood from description of the operation method above, according to the first embodiment, the linear damper 120 is produced such that the bumper portion 131 includes the elastic body. Thus, even in a case where the bumper portion 131 collides with a portion of the rack housing 104 facing the bumper portion 131 among the rack housing 104 and the intermediate coupling body 105 for which the linear damper 120 is provided and a great load rapidly acts thereon, great collision sound or impact can be reduced.

Implementation of the present invention is not limited to the above-described embodiment, and various changes can be made without departing from the object of the present invention. Note that in description of each modification, the same reference numbers are used to represent elements similar to those of the above-described embodiment and overlapping description thereof will be omitted.

For example, in the above-described embodiment, each of the bumper portion 131, the first displacement limit defining portion 144, and the second displacement limit defining portion 147 is made of the rubber material. However, the bumper portion 131, the first displacement limit defining portion 144, and the second displacement limit defining portion 147 are only required to be formed of elastic bodies which can elastically receive external force. In this case, a viscoelastic body which is slowly deformable in response to external force to absorb impact or vibration is preferred as the elastic body. As the viscoelastic body, a viscoelastic body having a low modulus of repulsion elasticity, specifically a viscoelastic body having a repulsion elasticity modulus of 50% or less, is preferred.

Thus, the bumper portion 131, the first displacement limit defining portion 144, and the second displacement limit defining portion 147 may be made, other than the rubber materials, of resin materials such as thermosetting elastomer materials (e.g., vulcanized rubber, urethane rubber, silicone rubber, and fluorine-containing rubber) and thermoplastic elastomer materials (e.g., styrene-based, olefin-based, vinyl chloride-based, urethane-based, and amide-based resins). Alternatively, the bumper portion 131, the first displacement limit defining portion 144, and the second displacement limit defining portion 147 may be made of materials other than the elastomer materials, such as a metal plate or coil spring and a damper sealing fluid having viscosity therein. Alternatively, the bumper portion 131, the first displacement limit defining portion 144, and the second displacement limit defining portion 147 may be produced in such a manner that a resin or metal plate having stiffness is bonded to a surface of an elastic body. According to this configuration, the bumper portion 131, the first displacement limit defining portion 144, and the second displacement limit defining portion 147 can improve abrasion resistance against a bump target object such as the rack housing 104, and can prevent damage of such a contact target object.

In the above-described embodiment, the bumper portion 131, the first displacement limit defining portion 144, and the second displacement limit defining portion 147 are formed in a circular ring shape. However, the bumper portion 131, the first displacement limit defining portion 144, and the second displacement limit defining portion 147 may be formed in annular shapes other than the circular shape (including an oval shape), such as polygonal shapes including a triangular shape, a rectangular shape, a pentagonal shape, and a hexagonal shape and irregular annular shapes. In this case, the bumper portion 131 and the second displacement limit defining portion 147 may be formed in a conical shape as in the first displacement limit defining portion 144. Alternatively, each of the bumper portion 131, the first displacement limit defining portion 144, and the second displacement limit defining portion 147 may be produced in such a manner that small pieces are arranged in an annular shape.

In the above-described embodiment, the bumper portion 131 includes the through-holes 131a and the bottomed holes 131c. With this configuration, the elasticity of the bumper portion 131 can be adjusted. Thus, for the bumper portion 131, the number, positions, or size of the through-holes 131a and the number, positions, or size of the bottomed holes 131c may be freely set according to required elasticity. However, the bumper portion 131 includes at least one of the bottomed hole or the through-hole so that the elasticity thereof can be adjusted. In a case where the through-holes 131a and the bottomed holes 131c are not necessary, such as a case where the bumper portion 131 already has the required elasticity without the through-holes 131a and the bottomed holes 131c, the through-holes 131a and the bottomed holes 131c may be omitted.

In the above-described embodiment, the bumper portion 131 is attached to the support base 130 in such a manner that the bolts 132 penetrate the through-holes 131a. However, the bumper portion 131 may be attached to the support base 130 using a technique other than the bolts 132, such as an adhesive or welding.

In the above-described embodiment, the bumper portion 131 is attached to the support base 130 via the fitting portion 131b. With this configuration, the bumper portion 131 can be attached to an accurate position of the support base 130. Further, misalignment or damage after attachment can be prevented. However, the bumper portion 131 may be formed without the fitting portion 131b. In this case, the fitting portion 130a is not necessary for the support base 130.

In the above-described embodiment, the linear damper 120 includes the first displacement limit defining portion 144 and the second displacement limit defining portion 147. With this configuration, the linear damper 120 can damp impact or external force when the relative displacement body 140 reaches the displacement limit position in response to the external force and when the relative displacement body 140 reaches the original displacement limit position before receiving the external force. That is, each of the first displacement limit defining portion 144 and the second displacement limit defining portion 147 is equivalent to a displacement limit defining portion according to the present invention. However, the linear damper 120 may be formed without at least one of the first displacement limit defining portion 144 or the second displacement limit defining portion 147.

In the above-described embodiment, the linear damper 120 includes the volume change compensation device 153. However, as long as the change in the volume of the fluid 126 can be ignored, the linear damper 120 may be formed without the volume change compensation device 153. Alternatively, in the linear damper 120, the volume change compensation device 153 may be provided outside the relative displacement body 140 or the inner chamber forming body 121.

In the above-described embodiment, the linear damper 120 is configured such that the relative displacement body 140 is coupled to each of the rack bar 103 and the intermediate coupling body 105 and the inner chamber forming body 121 contacts or separates from the rack housing 104. However, the linear damper 120 may be configured such that the inner chamber forming body 121 is coupled to the rack housing 104 and the rack bar 103 or the intermediate coupling body 105 approaches or separates from the relative displacement body 140. In this case, the relative displacement body 140 is formed in a cylindrical shape such that the rack bar 103 penetrates therethrough. Further, such a portion of the relative displacement body 140 that the rack bar 103 or part of the intermediate coupling body 105 directly coupled to the rack bar 103 approaches and contacts by reciprocation displacement of the rack bar 103 is provided with the bumper portion 131.

In the above-described embodiment, the linear damper 120 includes the four flow control valves, i.e., the three first flow control valves 127 and the single second flow control valve 128. However, the number of flow control valves and the specifications of the flow control valve are set as necessary according to the specifications of the linear damper 120, needless to say. Instead of or in addition to the inner chamber forming body 121, a flow control valve may be provided for the relative displacement body 140.

In the above-described embodiment, the linear damper 120 includes the return elastic body 155 having the wave washers. However, the return elastic body 155 may include an elastic body other than the wave washers, such as a coil spring. In a case where the relative displacement body 140 does not need to be constantly pressed, the linear damper 120 may be formed without the return elastic body 155.

In the above-described embodiment, the linear damper 120 is applied to the steering device 100. However, the linear damper 120 may be used with attached to devices or instruments other than the steering device 100, specifically a door opening/closing mechanism, a mechanical device other than the self-propelled vehicle, an electric device, an instrument, and furniture.

LIST OF REFERENCE NUMBERS

100 Steering Device
101 Steering Wheel
102 Steering Shaft
102a Pinion Gear
103 Rack Bar
103a Rack Gear
104 Rack Housing
105 Intermediate Coupling Body
106 Rack End
107 Stud
107a Ball Portion
108 Socket 108a Socket Body
108b Coupling Portion
110 Tie Rod
111 Knuckle Arm
112 Wheel
120 Linear damper
121 Inner Chamber Forming Body
122 Inner Peripheral Surface
123 Valve Support Portion
124 Seal Ring
125a First Inner Chamber
125b Second Inner Chamber
126 Fluid
127 First Flow Control Valve
128 Second Flow Control Valve
130 Support Base
130a Fitting Portion
131 Bumper Portion
131a Through-Hole
131b Fitting Portion
131c Bottomed Hole
132 Bolt
140 Relative Displacement Body
141 Inner Chamber Facing Portion
142 First Inner Chamber Forming Wall
143 Seal Ring
144 First Displacement Limit Defining Portion
145 Second Inner Chamber Forming Wall
146 Seal Ring
147 Second Displacement Limit Defining Portion
148 Rack End Coupling Portion
149 Rack Bar Coupling Portion
150 Compensation Device Housing Portion
151 Inner Chamber Communication Path
152 Atmosphere Communication Path
153 Volume Change Compensation Device
154 Elastic Body Holder
154a Receiving Portion
155 Return Elastic Body

The invention claimed is:

1. A linear damper comprising:
an inner chamber forming body formed in a tubular shape and having, inside a tubular portion, an inner chamber where fluid is liquid-tightly housed;
a relative displacement body slidably fitted in the inner chamber forming body and formed displaceable relative to the inner chamber forming body; and
a flow control valve provided in at least one of the inner chamber forming body or the relative displacement body to allow the fluid to flow while limiting a flow of the fluid,
wherein the linear damper is arranged between two attachment target objects linearly displaceable relative to each other to damp external force received due to relative displacement by limiting the flow of the fluid,
one of the inner chamber forming body or the relative displacement body has an attachment portion to be attached to one of the two attachment target objects,
another one of the inner chamber forming body or the relative displacement body has a bumper portion with which the other one of the two attachment target objects bumps, and
the bumper portion includes an elastic body elastically receiving bump of the other one of the two attachment target objects;
wherein the bumper portion comprises more than one bottomed holes and more than one through-holes.

2. The linear damper according to claim 1, further comprising:
a return elastic body providing elastic force to at least one of the inner chamber forming body or the relative displacement body to elastically press the inner chamber forming body or the relative displacement body formed with no bumper portion in a direction apart from the bumper portion.

3. The linear damper according to claim 1, wherein the bumper portion is formed in an annular shape.

4. The linear damper according to claim 1, wherein the bumper portion is made of an elastomer material.

5. The linear damper according to claim 4, wherein the bumper portion is formed with at least one of a bottomed hole or a through-hole.

6. The linear damper according to claim 1, wherein in the inner chamber, a displacement limit defining portion is provided on a surface of the inner chamber forming body facing the relative displacement body or on a surface of the relative displacement body facing the inner chamber forming body, and the displacement limit defining portion comprises an elastic body.

7. The linear damper according to claim 1, wherein the relative displacement body includes a volume change compensation device configured to compensate for a change in a volume of the fluid in the inner chamber.

8. A steering device including
a steering shaft formed so as to extend in a bar shape and configured to rotate by operation of a steering wheel;
a rack bar formed to extend in a bar shape to transmit a reciprocating motion, converted from a rotary motion of the steering shaft, in an axis direction;
an intermediate coupling body coupled to each end portion of the rack bar and directly or indirectly coupling a wheel targeted for steering to each end portion of the rack bar; and
a rack housing covering the rack bar, comprising:
the linear damper according to claim 1,
wherein the linear damper is provided between the rack housing and the rack bar or the intermediate coupling body to damp impact from the wheel and/or impact due to inertial force from a side of the steering shaft.

9. The steering device according to claim 8, wherein the relative displacement body is connected to the intermediate coupling body, and
the inner chamber forming body is formed so as to contact or separate from the rack housing by the reciprocating motion of the rack bar.

10. The steering device according to claim 8, wherein the inner chamber forming body is connected to an end portion of the rack housing, and the relative displacement body is formed such that the rack bar or the intermediate coupling body penetrates therethrough and the rack bar or the intermediate coupling body contacts or separates
from the relative displacement body by the reciprocating motion of the rack bar.

11. The linear damper according to claim 1, wherein when the bumper portion is provided on the inner chamber forming body, the displacement limit defining portion is provided on the relative displacement body, and
when the bumper portion is provided on the relative displacement body, the displacement limit defining portion is provided on the inner chamber forming body.

12. The linear damper according to claim 1, wherein the inner chamber comprises a first inner chamber and a second inner chamber, a volume of the first inner chamber and a volume a second inner chamber are configured to be changed according to a position of the relative displacement body that makes reciprocating sliding movement in the inner chamber forming body, in the inner chamber, a first displacement limit defining portion is provided on one of a surface of the inner chamber forming body facing the relative displacement body or a surface of the relative displacement body facing the inner chamber forming body, in the inner chamber, a second displacement limit defining portion is provided in one of the surface of the inner chamber forming body or the surface of the inner chamber forming body on which the first displacement limit defining portion is not provided, and at least one of the first displacement limit defining portion and the second displacement limit defining portion comprises an elastic body.

* * * * *